(12) United States Patent
Wang et al.

(10) Patent No.: US 11,586,831 B2
(45) Date of Patent: Feb. 21, 2023

(54) SPEECH TRANSLATION METHOD ELECTRONIC DEVICE AND COMPUTER-READABLE STORAGE MEDIUM USING SEQ2SEQ FOR DETERMINING ALTERNATIVE TRANSLATED SPEECH SEGMENTS

(71) Applicant: Beijing Bytedance Network Technology Co., Ltd., Beijing (CN)

(72) Inventors: Mingxuan Wang, Beijing (CN); Qianqian Dong, Beijing (CN); Lei Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 3 days.

(21) Appl. No.: 17/186,895

(22) Filed: Feb. 26, 2021

(65) Prior Publication Data
US 2021/0271826 A1 Sep. 2, 2021

(30) Foreign Application Priority Data
Feb. 28, 2020 (CN) .......................... 202010128882.5

(51) Int. Cl.
*G06F 40/58* (2020.01)
*G06F 16/33* (2019.01)
*G06F 40/47* (2020.01)
*G10L 15/00* (2013.01)
(52) U.S. Cl.
CPC ............ *G06F 40/47* (2020.01); *G10L 15/005* (2013.01)

(58) Field of Classification Search
CPC .............................. G06F 40/58; G06F 16/3337
USPC .......................................... 704/277; 707/748
See application file for complete search history.

(56) References Cited

U.S. PATENT DOCUMENTS

| 7,643,985 B2 * | 1/2010 | Horvitz ................... G06F 40/58 704/277 |
| 8,639,701 B1 * | 1/2014 | Lim ..................... G06F 16/3337 707/748 |
| 2017/0148436 A1 * | 5/2017 | Sugiura ................... G06F 40/58 |

OTHER PUBLICATIONS

Weiss etal.Sequence-to-Sequence Models Can Directrly Translate Foreign Speech (arXiv:1703.08581v2 [cs.CL] Jun. 12, 2017).*

(Continued)

*Primary Examiner* — Farzad Kazeminezhad

(57) ABSTRACT

Provided are a speech translation method and apparatus, an electronic device and a storage medium. The method includes: acquiring a source speech corresponding to a to-be-translated language; acquiring a specified target language; inputting the source speech and indication information matched with the target language into a pre-trained speech translation model, where the speech translation model is configured to translate a language in a first language set into a language in a second language set, the first language set includes a plurality of languages, the first language set includes the to-be-translated language, the second language set includes a plurality of languages, and the second language set includes the target language; and acquiring a translated speech corresponding to the target language and output by the speech translation model; where the to-be-translated language is different from the target language.

14 Claims, 4 Drawing Sheets

(56) References Cited

OTHER PUBLICATIONS

Speech-To-Speech Translation Between Untranscribed Unknown Languages (Andros Tjandra, Sakriani Sakti, Satoshi Nakamura, 978-1-7281-0306-8/19/c2019 IEEE.*

* cited by examiner

SPEECH TRANSLATION METHOD ELECTRONIC DEVICE AND COMPUTER-READABLE STORAGE MEDIUM USING SEQ2SEQ FOR DETERMINING ALTERNATIVE TRANSLATED SPEECH SEGMENTS

CROSS-REFERENCE TO RELATED APPLICATION(S)

This application claims priority to Chinese Patent Application No. 202010128882.5 filed Feb. 28, 2020, the disclosure of which is incorporated herein by reference in its entirety.

TECHNICAL FIELD

The present disclosure relates to the field of speech recognition and, in particular, to a speech translation method and apparatus, an electronic device and a storage medium.

BACKGROUND

Simultaneous interpretation refers to a translation mode in which an interpreter incessantly interprets the content of a speaker to audiences without interrupting the speaker.

At present, the mode of implementing the simultaneous interpretation is as follows: a source speech is recognized as a text in a first language, the text in the first language is machine-translated into a text in a second language, and a speech in a target language is generated based on the text in the second language.

However, in this mode, only the translation from the speech in one language to the speech in another language can be achieved, that is, only one-to-one translation between speeches is supported. In addition, this mode includes three steps of speech-to-text, text translation and text-to-speech, so that the time of the speech translation is long. Moreover, since errors occur in each step, and the errors of the previous step are carried over to the next step, the accuracy of the speech translation is reduced.

SUMMARY

Embodiments of the present disclosure provide a speech translation method and apparatus, an electronic device and a storage medium, so that speech translation between multiple languages can be achieved and the efficiency and accuracy of the speech translation can be improved.

In a first aspect, an embodiment of the present disclosure provides a speech translation method. The speech translation method includes the steps described below.

A source speech corresponding to a to-be-translated language is acquired.

A specified target language is acquired.

The source speech and indication information matched with the target language are input into a pre-trained speech translation model, where the speech translation model is configured to translate a language in a first language set into a language in a second language set, the first language set includes a plurality of languages, the first language set includes the to-be-translated language, the second language set includes a plurality of languages, and the second language set includes the target language.

A translated speech corresponding to the target language and output by the speech translation model is acquired. The to-be-translated language is different from the target language.

In a second aspect, an embodiment of the present disclosure further provides a speech translation apparatus. The speech translation apparatus includes a source speech acquisition module, a target language specifying module, a language translation module and a translated speech acquisition module.

The source speech acquisition module is configured to acquire a source speech corresponding to a to-be-translated language.

The target language specifying module is configured to acquire a specified target language.

The language translation module is configured to input the source speech and indication information matched with the target language into a pre-trained speech translation model, where the speech translation model is configured to translate a language in a first language set into a language in a second language set, the first language set includes a plurality of languages, the first language set includes the to-be-translated language, the second language set includes a plurality of languages, and the second language set includes the target language.

The translated speech acquisition module is configured to acquire a translated speech corresponding to the target language and output by the speech translation model. The to-be-translated language is different from the target language.

In a third aspect, an embodiment of the present disclosure further provides an electronic device. The electronic device includes a memory, a processor and a computer program stored in the memory and executable by the processor. The processor, when executing the computer program, performs the speech translation method of any embodiment of the present disclosure.

In a fourth aspect, an embodiment of the present disclosure further provides a computer-readable storage medium storing a computer program. The computer program, when executed by a processor, performs the speech translation method of any embodiment of the present disclosure.

According to the embodiments of the present disclosure, the source speech is input into the pre-trained speech translation model, the target language is specified, and the translated speech corresponding to the target language and output by the speech translation model is acquired, so that the issues in the related art that only one-to-one translation between speeches is supported and the accuracy of speech-to-speech translation is low are solved. In the embodiments of the present disclosure, the language is specified, and the translated speech in any specified language is acquired, so that the conversion from any speech to a speech in any language is achieved. At the same time, the speech translation is achieved only through the speech translation model, so that the speech translation process is simplified, translation errors amplified in an intermediate stage are reduced, and the efficiency and accuracy of the speech translation are improved.

DETAILED DESCRIPTION

Figure 1:
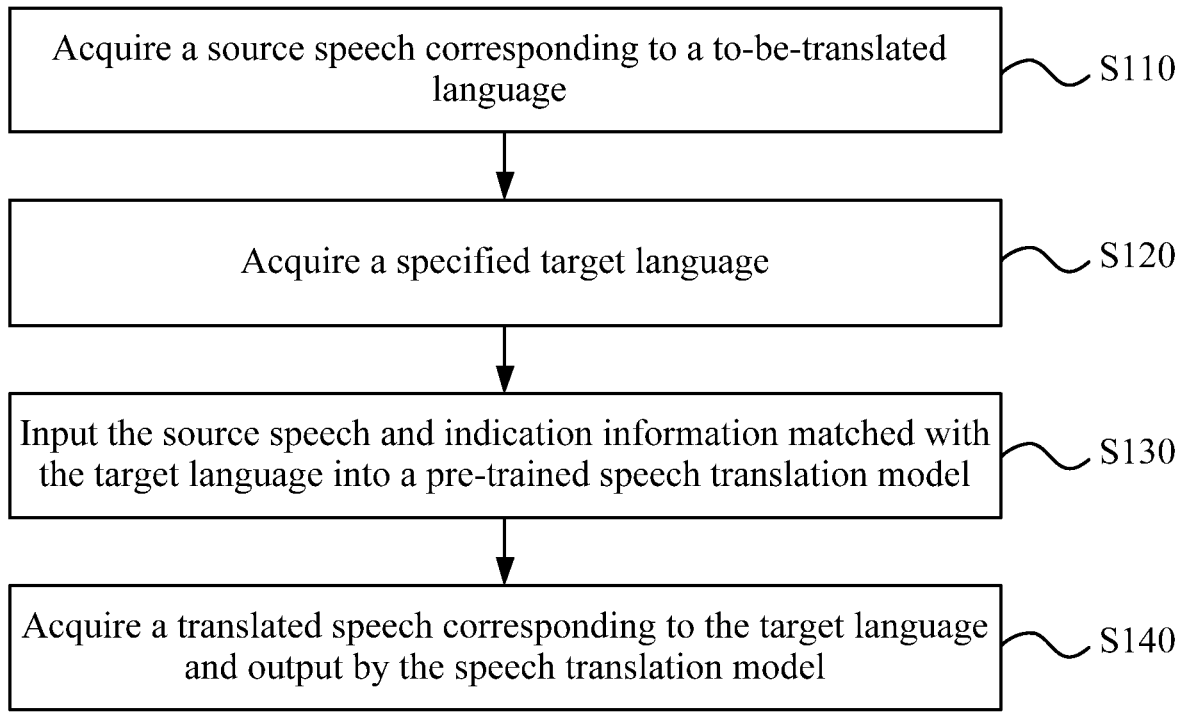
FIG. 1 is a flowchart of a speech translation method according to an embodiment of the present disclosure.

Embodiments of the present disclosure will be described in detail with reference to the drawings. Although some embodiments of the present disclosure are shown in the drawings, it is to be understood that the present disclosure may be implemented in various forms and should not be construed as limited to the embodiments set forth herein; conversely, these embodiments are provided so that the present disclosure will be thoroughly and completely understood. It is to be understood that the drawings and embodiments of the present disclosure are merely for illustrative purposes and are not intended to limit the scope of the present disclosure.

It is to be understood that the various steps recited in the method embodiments of the present disclosure may be performed in a different order, and/or in parallel. In addition, the method embodiments may include additional steps and/or omit performing the illustrated steps. The scope of the present disclosure is not limited in this respect.

As used herein, the term "include" and variations thereof are intended to be inclusive, that is, "includes, but does not limited to". The term "based on" is "at least partially based on". The term "one embodiment" means "at least one embodiment"; the term "another embodiment" means "at least one another embodiment"; the term "some embodiments" means "at least some embodiments". Related definitions of other terms will be given in the following description.

It is to be noted that references to "first", "second" and the like in the present disclosure are merely intended to distinguish one from another apparatus, module, or unit and are not intended to limit the order or interrelationship of the functions performed by the apparatus, module, or unit.

It is to be noted that references to modifications of "one" or "a plurality of" in the present disclosure are intended to be illustrative and not limiting, and that those skilled in the art should understand that "one or a plurality of" are intended unless the context clearly indicates otherwise.

The names of messages or information exchanged between multiple apparatuses in the embodiments of the present disclosure are only for illustrative purposes and are not intended to limit the scope of such messages or information.

EMBODIMENTS

FIG. 1 is a flowchart of a speech translation method according to an embodiment of the present disclosure. The speech translation method can be applicable to translating a source speech into a translated speech corresponding to any specified target language. The speech translation method may be performed by a speech translation apparatus. The speech translation apparatus may be implemented in the form of software and/or hardware and may be configured in an electronic device. The electronic device may be a terminal device which may include a mobile phone, an in-vehicle terminal a laptop or the like, or may be a server. As shown in FIG. 1, the method includes the steps described below.

In step S110, a source speech corresponding to a to-be-translated language is acquired.

The source speech is used as the speech to be translated, including audio signals of a speaker's voice. In an embodiment, the source speech is stored as an audio format file. The source speech may include speech segments in at least one language. For example, the source speech may be Chinese: "我爱唱歌", or may be speech segments in both English and Chinese: "I love to 唱歌". This source speech includes an English segment "I love to" and a Chinese segment "唱歌".

In fact, the source speech may be obtained through pre-processing of a captured speech. The pre-processing may include processing such as noise reduction, pre-emphasis and endpoint detection.

The to-be-translated language is the language of the source speech, and the number of the to-be-translated speeches is at least one. If the source speech is a speech in a single language, the to-be-translated language is a single language. If the source speech is a speech in mixed languages, the to-be-translated language is the mixed languages or one language of the mixed languages. Exemplarily, the to-be-translated language may be the language with the maximum number of words in the mixed languages. For example, the source speech is "I love to 唱歌", the English segment includes three words, and the Chinese segment includes one word. The number of English words is greater than the number of Chinese words, so that the to-be-translated language is English.

In step S120, a specified target language is acquired.

The target language is used for determining the language of the translated speech. The target language is generally specified by a user, or may be randomly specified according to set rules. In an embodiment, input information of the user is acquired to determine the target language.

In step S130, the source speech and indication information matched with the target language are input into a pre-trained speech translation model. The speech translation model is configured to translate a language in a first language set into a language in a second language set, the first language set includes multiple languages, the first language set includes the to-be-translated language, the second language set includes multiple languages, and the second language set includes the target language.

The speech translation model is configured to translate any speech into a translated speech in any language, that is, to translate a speech in M languages into translated speeches in N languages. In an embodiment, the speech translation model includes a machine learning model, for example, a neural network model, in an embodiment, a single neural network model (such as a convolutional neural network model) or a fusion neural network model (such as a fusion convolutional neural network model and a recurrent neural network model) and the like.

The indication information matched with the target language is used for identifying the target language, and indication information matched with different target languages is different. Exemplarily, the indication information may be set characters, for example, 1-Chinese, 2-English, 3-Japanese, or a-Chinese, b-English, c-Japanese, or the indication information may be symbols, which is not limited in the embodiments of the present disclosure.

The first language set includes at least two languages, and the second language set includes at least two languages. The first language set and the second language set are not exactly the same, that is, a language set formed by the first language set and the second language set includes at least three languages.

In step S140, a translated speech corresponding to the target language and output by the speech translation model is acquired. The to-be-translated language corresponding to the source speech is different from the target language.

The translated speech may refer to a speech that has the same semantics as the source speech but in a different language. The to-be-translated language refers to the language corresponding to the source speech. The source speech corresponds to at least one to-be-translated language. If the number of the to-be-translated languages is at least two, the target language is different from at least one to-be-translated language.

In an embodiment, the step in which the translated speech corresponding to the target language and output by the speech translation model is acquired includes the following steps: an encoder in the speech translation model extracts a speech feature in the source speech and performs encoding, to form a feature vector of the source speech, where the speech translation model is a Seq2Seq model; and a decoder in the speech translation model maps, according to the feature vector and the target language, the feature vector into a speech sequence of the target language as the translated speech.

Figure 2:
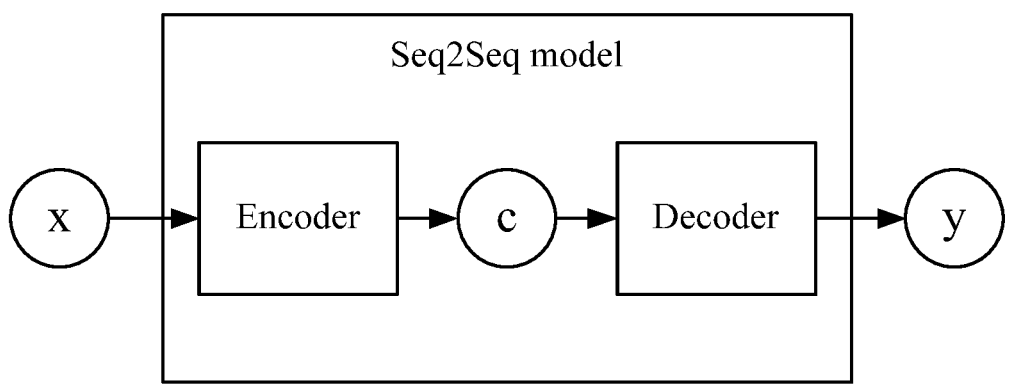
FIG. 2 is schematic diagram of a sequence to sequence (Seq2Seq) model applicable to an embodiment of the present disclosure.

The speech translation model is the Seq2Seq model. In fact, the Seq2Seq model is a variant of a recurrent neural network model and includes an encoder and a decoder. As shown in FIG. 2, the encoder is configured to encode information of a sequence, that is, encode information (x) of a sequence with an arbitrary length into the feature vector (c). In an embodiment, the encoder segments and encodes the speech sequence represented by the source speech to convert into the feature vector. The decoder is configured to analyze the feature vector (c) according to context information to form a speech sequence (y), that is, the translated speech. The feature vector is in fact used for characterizing the feature of the source speech.

The translation from the source speech to the translated speech in the target language is achieved through the adoption of the Seq2Seq model. The source speech can be directly used as a speech sequence for being converted into a speech sequence in the specified language as the translated speech, so that the speech translation process is simplified, translation errors amplified in an intermediate stage are reduced, and the efficiency and accuracy of the speech translation are improved.

In an embodiment, the step in which the encoder in the speech translation model extracts the speech feature in the source speech and performs the encoding, to form the feature vector of the source speech includes the following steps: the encoder segments the source speech to form at least one source speech segment; the encoder acquires a respective speech feature of each of the at least one source speech segment and the speech feature of the source speech to form at least one speech element, where the speech feature includes at least one of: a time duration, a frequency, an intensity, a timbre or a spectrum characteristic; and the encoder sequentially converts, according to all of the at least one speech element, an initial vector to form the feature vector.

The source speech segment is part speech of the source speech, and the time durations of different source speech segments may be different or the same. The speech element is used for characterizing the speech feature of one source speech segment or the speech feature of the overall source speech. The feature vector is used for characterizing and aggregating all of the speech features extracted from the source speech. The speech feature of the source speech segment may be used for determining the idiomatic collocation structures of characters, words and sentences in the source speech segment, and the speech feature of the source speech is used for determining a grammatical structure relationship.

Generally, the source speech is translated character by character, word by word, or sentence by sentence. Therefore, the source speech may be segmented to form the segments of characters, words or sentences and then be translated. Thus, the encoder may segment the source speech according to time, in an embodiment, according to a set time duration, or according to time points of pauses identified in the speaker's speech, to form the source speech segments. All of the source speech segments compose the source speech. The source speech segment may represent a speech segment of a character, a word or a sentence.

Speech features may be extracted separately from each source speech segment to form speech elements, and at the same time, the overall speech feature may further be extracted from the source speech to form the speech elements. The speech feature includes at least one of: the time duration, the frequency, the intensity, the timbre or the spectrum characteristic. The time duration may refer to the time duration of the speech. The frequency may refer to the frequency of the speech. The intensity may refer to the amplitude of the speech. The timbre is used for describing the feature of a speech waveform. The spectrum characteristic is used for evaluating the distribution of the frequency, for example, the spectrum characteristic may be mel-frequency cepstral coefficients. In addition, other speech features exist, which are not limited in the embodiments of the present disclosure.

When the encoder calculates the feature vector, an initial hidden layer vector is generally pre-configured, and a speech element is used as input, and then a hidden layer vector corresponding to the current time instant is calculated. Then, speech elements are separately used as input in sequence, and the hidden layer vector obtained at the previous time instant is converted to obtain the hidden layer vector corresponding to the current time instant. When the input of all of the speech elements is completed, the obtained hidden layer vector is the feature vector.

Figure 3:
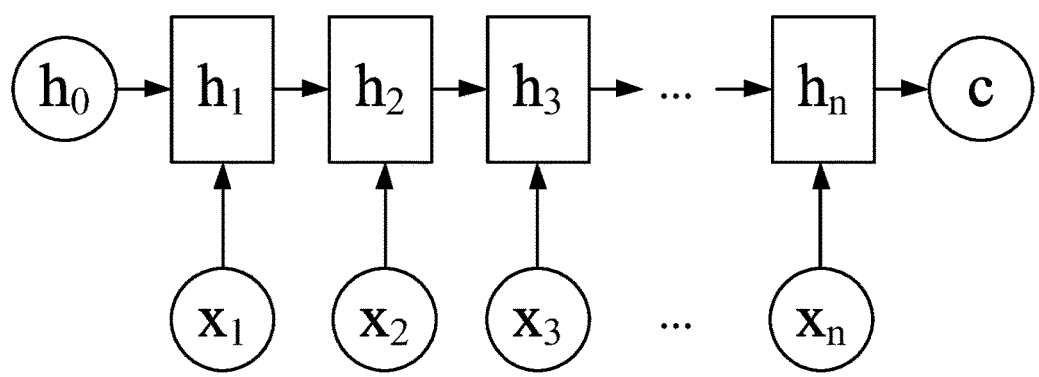
FIG. 3 is schematic diagram of an encoder in a Seq2Seq model applicable to an embodiment of the present disclosure.

Exemplarily, as shown in FIG. 3, $h_1, h_2, h_3, \ldots, h_n$ are hidden layer vectors related to the state of the previous time instant and the current input. $h_0$ is a preset initial hidden layer vector, $x_1, x_2, x_3, \ldots, x_n$ are speech elements, and c is the feature vector. $h_1$ is calculated according to $h_0$ and the input $x_1$ at the time instant, $h_2$ is calculated according to $h_1$ and the input $x_2$ at the time instant, and so on, and c is calculated according to $h_n$ and the input $x_n$ at the time instant.

The encoder segments the source speech to form at least one source speech segment, extracts the speech features separately as the speech elements, and converts the initial hidden layer vector, to form the feature vector used for characterizing the feature of the source speech, so that the encoding process is implemented. In this way, the source speech is accurately mapped into the feature vector according to human speaking habits, so that the representativeness of the feature vector is improved.

In an embodiment, the step in which the decoder in the speech translation model maps, according to the feature vector and the target language, the feature vector into the speech sequence of the target language includes the following steps: the decoder analyzes the feature vector to determine at least one alternative translated speech segment; and target translated speech segments matched with the target language are inquired from the at least one alternative translated speech segment, and the target translated speech segments are stitched to form the speech sequence of the target language.

The alternative translated speech segments include translated speech segments in multiple languages, and target translated speech segments belonging to the target language may be screened from the alternative translated speech segments. The target translated speech segments are used for composing the translated speech. The target translated speech segments belonging to the target language are screened from the alternative translated speech segments, and the target translated speech segments are stitched to form the speech sequence, such that the language of the speech sequence is the target language.

In fact, the speech translation model may implement the translation from the source speech to the translated speech in any language. When the decoder performs decoding to form the speech segments, the speech segments matched with the target language may be screened according to the specified target language, so that the segments composing the translated speech corresponding to the target language are formed, and the segments are stitched to finally form the translated speech.

In an embodiment, when the decoder analyzes the feature vector, the feature vector is generally used as the input, the hidden layer vector corresponding to the current time instant is calculated, the alternative translated speech segments are determined, a respective probability (such as confidence) of each alternative translated speech segment is calculated, and the target translated speech segment is determined according to the respective probability of each alternative translated speech segment. Subsequently, according to the hidden layer vector obtained at the previous time instant, the hidden layer vector corresponding to the current time instant is calculated, the alternative translated speech segments corresponding to the current time instant are determined, the respective probability of each alternative translated speech segment is calculated, and the target translated speech segment corresponding to the current time instant is determined. Exemplarily, the step in which the hidden layer vector corresponding to the current time instant is calculated according to the hidden layer vector obtained at the previous time instant to determine the target translated speech segment may include that: the hidden layer vector corresponding to the current time instant may be calculated merely according to the hidden layer vector obtained at the previous time instant, or the hidden layer vector corresponding to the current time instant and the target translated speech segment corresponding to the current time instant may be determined according to the hidden layer vector obtained at the previous time instant, the feature vector and the target translated speech segment corresponding to the previous time instant.

According to the probability of each alternative translated speech segment, the alternative translated speech segment of the highest probability is screened as the target translated speech segment. For example, the alternative translated speech segment matched with the target language has a higher probability than the alternative translated speech segment not matched with the target language, so that the target translated speech segment is screened.

Figure 4:
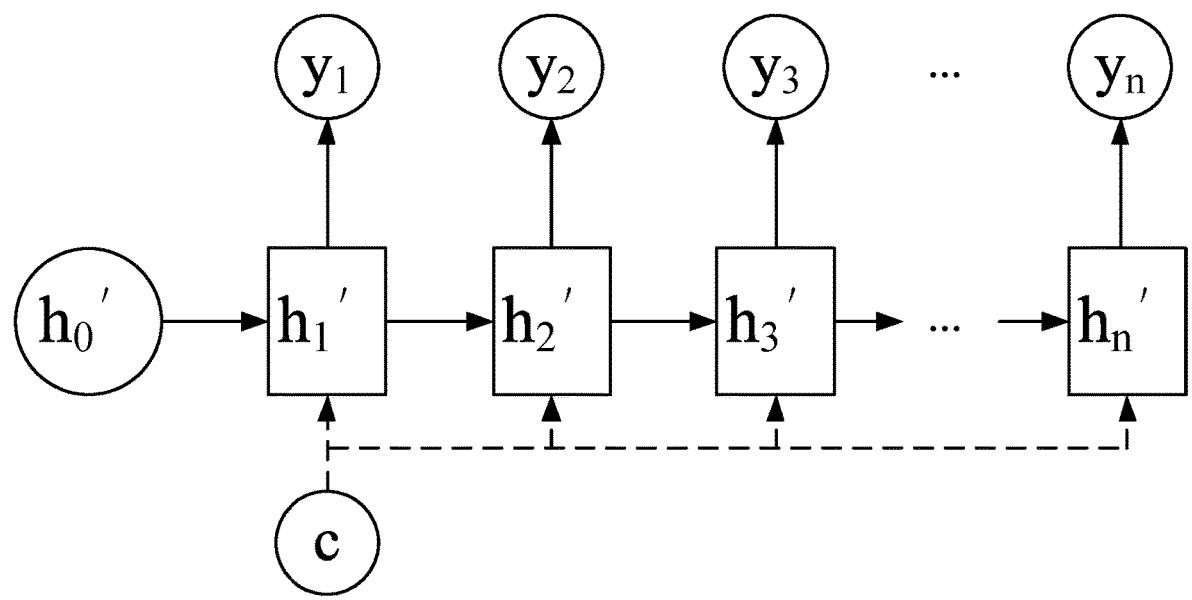
FIG. 4 is schematic diagram of a decoder in a Seq2Seq model applicable to an embodiment of the present disclosure.

Exemplarily, as shown in FIG. 4, $h_1'$, $h_2'$, $h_3'$, ..., $h_n'$ are hidden layer vectors related to the state of the previous time instant and the current input. $h_0'$ is a preset initial hidden layer vector, $y_1$, $y_2$, $y_3$, ..., $y_n$ are an output sequence, and c is the feature vector. $h_1'$ is calculated according to $h_0'$ and c, $h_2'$ is calculated according to $h_1'$ and c, and so on, and $h_n'$ is calculated according to $h_{n-1}'$ and c. At the same time, the probabilities of multiple alternative translated speech segments are calculated according to $h_0$, $h_1'$ and c, and a target translated speech segment is determined from the multiple alternative translated speech segments to be as $y_1$ to output. Then the probabilities of multiple alternative translated speech segments are calculated according to $h_1'$, $y_1$ and c, and a target translated speech segment is determined from the multiple alternative translated speech segments to be as $y_2$ to output, and so on, and $y_n$ is output according to $h_{n-1}'$, $y_{n-1}$ and c. $y_1$, $y_2$, $y_3$, ..., $y_n$ are stitched to obtain a speech which is the translated speech.

The feature vector formed by the encoder is analyzed by the decoder, and the target translated speech segments matched with the target language are screened and stitched to form the translated speech. The target translated speech segments matched with the target language may be screened from the translated speech segments corresponding to multiple languages and be stitched to form the translated speech, so that the source speech can be translated into multiple speeches, and the translated speech in the target language can be obtained accurately in the case where the language of the translated speech is specified.

In an embodiment, the encoder and the decoder each include a neural network model.

In fact, the encoder and the decoder may both be constructed based on the neural network model. The neural network model may include at least one of: a convolutional neural network model, a recurrent neural network model, a deep neural network model, a back-propagation neural network model, a long short-term memory network model or a gate repeat unit model. The encoder and the decoder are constructed by the adoption of the neural network model, so that the accuracy of the encoding of the source speech and the decoding of the feature vector can be improved, and the accuracy of the translation of the source speech can be improved.

In addition, the Seq2Seq model may further adopt an Attention mechanism. In fact, when the decoder analyzes the feature vector, the target translated speech segments are not only related to the hidden layer vector at the previous time instant in the decoder, the feature vector and the target translated speech segment corresponding to the previous time instant, but also related to the hidden layer vectors in the encoder. Through the Attention mechanism, the calculation is performed on each target translated speech segment, the weight of each hidden layer vector in the encoder is determined, the input of the decoder at the current time instant is weighted and summed with the hidden layer vectors in the encoder at all the time instants to calculate the hidden layer vector and the target translated speech segment at the next time instant, so that the target translated speech segments are determined more accurately.

According to the embodiments of the present disclosure, the source speech is input into the pre-trained speech translation model, the target language is specified, and the translated speech corresponding to the target language and output by the speech translation model is acquired, so that the issues in the related art that only one-to-one translation between speeches is supported and the accuracy of speech-to-speech translation is low are solved. In the embodiments of the present disclosure, the language is specified, and the translated speech in any specified language is acquired, so that the conversion from any speech to a speech in any language is achieved. At the same time, the speech translation is achieved only through the speech translation model, so that the speech translation process is simplified, translation errors amplified in an intermediate stage are reduced, and the efficiency and accuracy of the speech translation are improved.

Figure 5:
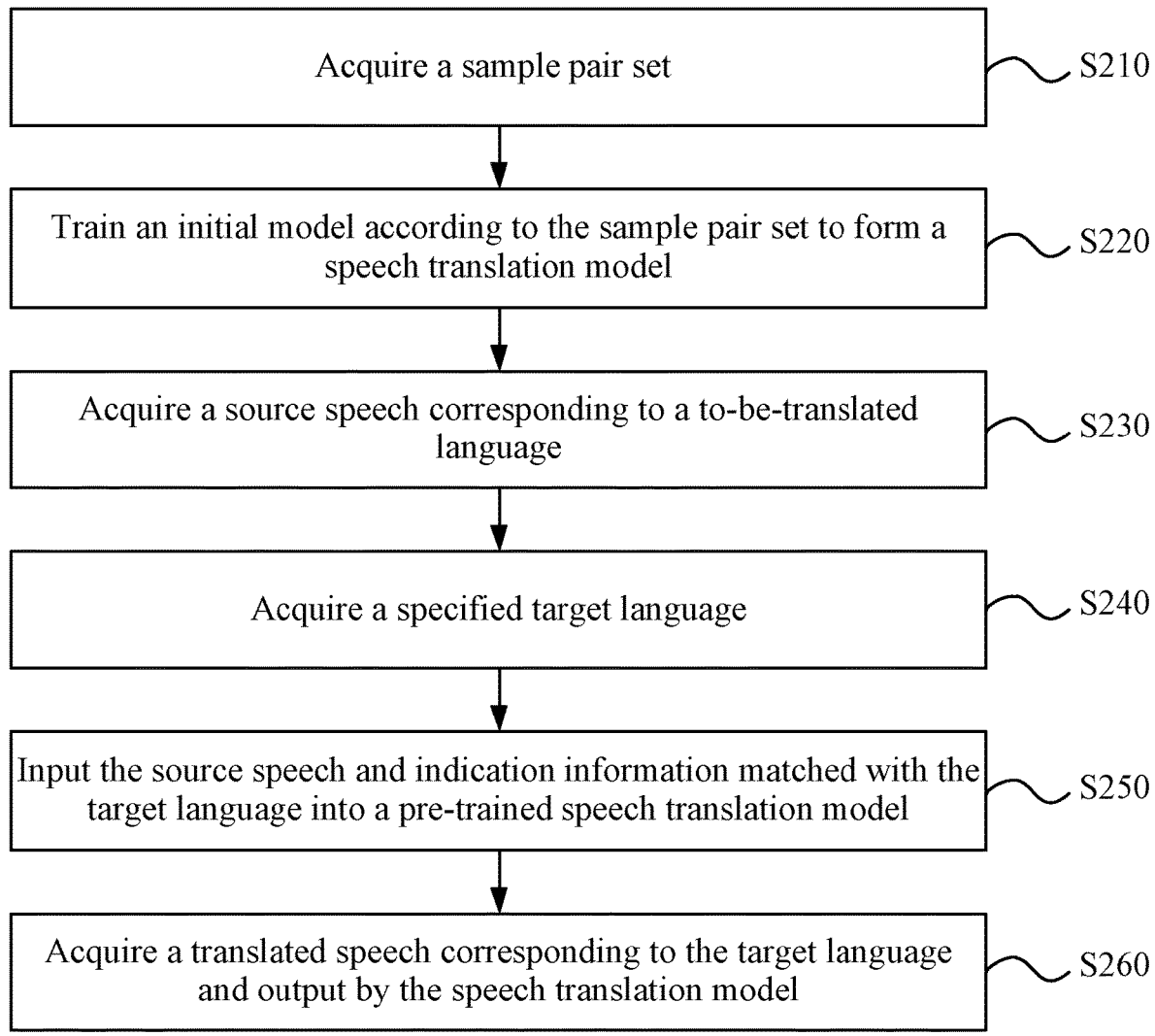
FIG. 5 is a flowchart of a speech translation method according to an embodiment of the present disclosure.

In an example implementation, FIG. 5 is a flowchart of a speech translation method according to an embodiment of the present disclosure. The method includes the steps described below.

In step S210, a sample pair set is acquired, where each sample pair in the sample pair set includes a respective target source speech and a respective target translated speech, and the respective target translated speech is marked with language information.

The sample pair refers to a combination of the target source speech and the target translated speech. The sample pair set includes multiple sample pairs. The sample pairs are used as training samples. Exemplarily, the language of the target source speech and the language of the target translated speech in the sample pair may be the same or different.

It is to be noted that the speech may be directly captured from a network, and the language of the speech is generally determined according to the source of the capture. For example, the language of the speech captured from broadcasting may be English. The manual translation may be performed, a speech with the same semantics in another language may be captured as the target source speech, and the captured speech is used as the target translated speech, such that a sample pair is formed. Alternatively, text recognition may be performed on the captured speech in an existing mode, the recognized text is translated to generate a translated text in another language, and then, a speech is correspondingly generated as the target source speech, and the captured speech is used as the target translated speech, such that a sample pair is formed.

The language information is used for identifying the language of a speech. Only the target translated speech in the sample pair may be marked, or, the target source speech and the target translated speech in the sample pair may be both marked.

Exemplarily, the language information may be set characters, for example, 1-Chinese, 2-English, 3-Japanese, or a-Chinese, b-English, c-Japanese, or, the language information may be symbols, which is not limited in the embodiments of the present disclosure.

In addition, a source speech in mixed languages may be marked as only one language, for example, marked as the language with the maximum number of words. Alternatively, the source speech in mixed languages may be marked as the languages separately. For example, the target source speech is "I love to 唱歌", and based on that the English segment includes three words, and the Chinese segment includes one word, the target source speech may be marked as English; or "I love to" may be marked as English and " 唱歌 " may be marked as Chinese; or "I love to 唱歌," may be marked as Chinese.

In an embodiment, the target source speech in the sample pair corresponds to at least two to-be-translated languages, and at least one to-be-translated language corresponding to the target source speech is different from the language of the target translated speech.

The target source speech may include speech segments in multiple to-be-translated languages. At least one to-be-translated language of the multiple to-be-translated languages corresponding to the target source speech is different from the language of the target translated speech. A sample pair is formed by the target translated speech and the target source speech including at least two to-be-translated languages, and the sample pair in fact implements the translation on the speech in mixed languages.

Exemplarily, the target source speech in the sample pair is "I love to 唱歌", and the target translated speech is " 我喜欢唱歌 ".

The number of to-be-translated languages corresponding to the target source speech in a sample pair is configured to at least two, and the model is trained based on the sample pair, so that a speech of a sentence in mixed languages can be translated, the translation of a speech in multiple languages is supported, the translation accuracy of the speech model is improved, and the implementation cost of the speech translation is reduced.

In step S220, An initial model is trained according to the sample pair set to form a speech translation model. The sample pair set corresponds to at least three languages.

The sample pair set includes a large number of sample pairs for training the initial model. The initial model is a speech translation model that is not completely trained. The initial model is trained according to the sample pairs in the sample pair set to form the speech translation model.

Translation between speeches in different languages may be implemented by the speech translation model. The sample pairs included in the sample pair set correspond to at least three languages, so that the trained speech translation model can implement the mutual translation of the speeches in at least three languages.

In step S230, a source speech corresponding to a to-be-translated language is acquired.

In step S240, a specified target language is acquired.

In step S250, the source speech and indication information matched with the target language are input into a pre-trained speech translation model. The speech translation model is configured to translate a language in a first language set into a language in a second language set, the first language set includes multiple languages, the first language set includes the to-be-translated language, the second language set includes multiple languages, and the second language set includes the target language.

In step S260, a translated speech corresponding to the target language and output by the speech translation model is acquired. The to-be-translated language is different from the target language.

According to the embodiments of the present disclosure, the sample pairs in multiple languages are configured to train the initial model so as to form the speech translation model for the mutual translation of speeches in multiple languages. Therefore, the speech translation model supports the mutual translation of speeches in multiple languages, and the accuracy of the mutual translation of speeches in multiple languages is improved.

Figure 6:
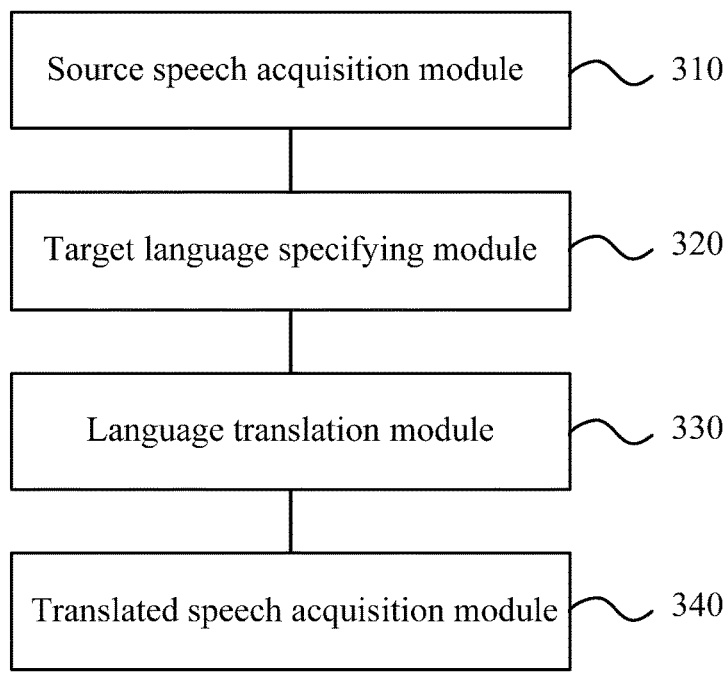
FIG. 6 is a structural diagram of a speech translation apparatus according to an embodiment of the present disclosure.

FIG. 6 is a structural diagram of a speech translation apparatus according to an embodiment of the present disclosure. The speech translation apparatus can be applicable to translating a source speech into a translated speech corresponding to any specified target language. The apparatus may be implemented in the form of software and/or hardware, and the apparatus may be configured in an electronic device. As shown in FIG. 6, the apparatus may include a source speech acquisition module 310, a target language specifying module 320, a language translation module 330 and a translated speech acquisition module 340.

The source speech acquisition module 310 is configured to acquire a source speech corresponding to a to-be-translated language.

The target language specifying module 320 is configured to acquire a specified target language.

The language translation module 330 is configured to input the source speech and indication information matched with the target language into a pre-trained speech translation model. The speech translation model is configured to translate a language in a first language set into a language in a second language set, the first language set includes multiple languages, the first language set includes the to-be-translated language, the second language set includes multiple languages, and the second language set includes the target language.

The translated speech acquisition module 340 is configured to acquire a translated speech corresponding to the target language and output by the speech translation model. The to-be-translated language is different from the target language.

According to the embodiments of the present disclosure, the source speech is input into the pre-trained speech translation model, the target language is specified, and the translated speech corresponding to the target language and output by the speech translation model is acquired, so that the issues in the related art that only one-to-one translation between speeches is supported and the accuracy of speech-to-speech translation is low are solved. In the embodiments of the present disclosure, the language is specified, and the translated speech in any specified language is acquired, so that the conversion from any speech to a speech in any language is achieved. At the same time, the speech translation is achieved only through the speech translation model, so that the speech translation process is simplified, translation errors amplified in an intermediate stage are reduced, and the efficiency and accuracy of the speech translation are improved.

Further, the translated speech acquisition module 340 includes a Seq2Seq model translation unit. The Seq2Seq model translation unit is configured to, through an encoder in the speech translation model, extract a speech feature in the source speech and perform encoding, to form a feature vector of the source speech; where the speech translation model is a Seq2Seq model; and through a decoder in the speech translation model and according to the feature vector and the target language, map the feature vector into a speech sequence of the target language as the translated speech.

Further, the Seq2Seq model translation unit includes an encoding subunit. The encoding subunit is configured to, through the encoder, segment the source speech to form at least one source speech segment; through the encoder, acquire a respective speech feature of each of the at least one source speech segment and the speech feature of the source speech to form at least one speech element, where the speech feature includes at least one of: a time duration, a frequency, an intensity, a timbre or a spectrum characteristic; and through the encoder and according to all of the at least one speech element, sequentially convert an initial vector to form the feature vector.

Further, the Seq2Seq model translation unit includes a decoding subunit. The decoding subunit is configured to, through the decoder, analyze the feature vector to determine at least one alternative translated speech segment; and inquire, from the at least one alternative translated speech segment, target translated speech segments matched with the target language, and stitch the target translated speech segments to form a speech sequence of the target language.

Further, the speech translation apparatus further performs: before inputting the source speech into the pre-trained speech translation model, acquiring a sample pair set, where each sample pair in the sample pair set includes a respective target source speech and a respective target translated speech, and the respective target translated speech is marked with language information; and training an initial model according to the sample pair set to form the speech translation model, where the sample pair set corresponds to at least three languages.

Further, the respective target source speech in each sample pair corresponds to at least two to-be-translated languages, and at least one to-be-translated language corresponding to the respective target source speech is different from the language of the target translated speech.

Further, the encoder and the decoder each include a neural network model.

The speech translation apparatus provided by the embodiment of the present disclosure belongs to the same concept as the speech translation method, the details which are not described in the embodiment of the present disclosure may refer to the foregoing, and the embodiment of the present disclosure has the same effects as the embodiments of the foregoing.

Figure 7:
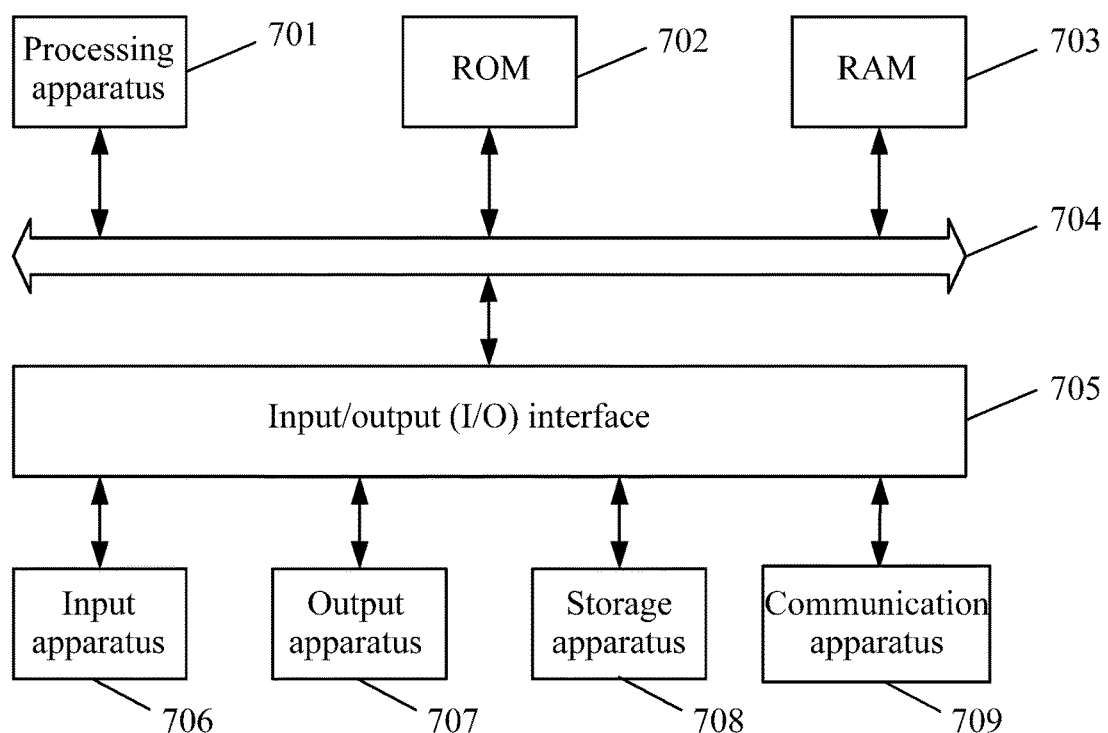
FIG. 7 is a structural diagram of an electronic device according to an embodiment of the present disclosure.

FIG. 7 shows a structural diagram of an electronic device 700 (such as the terminal device or server in FIG. 1) applicable to implementing the embodiments of the present disclosure. The terminal device in the embodiments of the present disclosure may include, but is not limited to, mobile terminals such as a mobile phone, a laptop, a digital broadcast receiver, a personal digital assistant (PDA), a pad (tablet computer), a portable media player (PMP), and an in-vehicle terminal (such as an in-vehicle navigation terminal) and stationary terminals such as a digital television (TV) and a desktop computer. The electronic device shown in FIG. 7 is merely an example and is not intended to limit the function and usage scope of the embodiments of the present disclosure.

As shown in FIG. 7, the electronic device 700 may include a processing apparatus 701 (such as a central processing unit and a graphics processing unit). The processing apparatus 701 may perform various types of appropriate operations and processing based on a program stored in a read-only memory (ROM) 702 or a program loaded from a storage apparatus 708 to a random-access memory (RAM) 703. Various programs and data required for the operations of the electronic device 700 are also stored in the RAM 703. The processing apparatus 701, the ROM 702 and the RAM 703 are connected to each other through a bus 704. An input/output (I/O) interface 705 is also connected to the bus 704.

Generally, the following apparatus may be connected to the I/O interface 705: an input apparatus 706 including such as a touch screen, a touch pad, a keyboard, a mouse, a camera, a microphone, an accelerometer, and a gyroscope; an output apparatus 707 including such as a liquid crystal display (LCD), a speaker, and a vibrator; the storage apparatus 708 including such as a magnetic tape and a hard disk; and a communication apparatus 709. The communication apparatus 709 may allow the electronic device 700 to perform wireless or wired communication with other devices to exchange data. Although FIG. 7 shows the electronic device 700 having various apparatuses, it is to be understood that not all of the apparatuses shown herein need to be implemented or present. Alternatively, more or fewer apparatuses may be implemented or present.

Particularly, according to the embodiments of the present disclosure, the processes described above with reference to the flowcharts may be implemented as computer software programs. For example, the embodiment of the present disclosure includes a computer program product. The computer program product includes a computer program carried in a non-transitory computer-readable medium. The computer program includes program codes for performing the method shown in the flowchart. In such an embodiment, the computer program may be downloaded from a network and installed through the communication apparatus 709, or may be installed from the storage apparatus 708, or may be installed from the ROM 702. When the computer program is executed by the processing apparatus 701, the preceding functions defined in the method of the embodiments of the present disclosure are performed.

It is to be noted that the computer-readable medium described above in the present disclosure may be a computer-readable signal medium or a computer-readable storage medium or any combination thereof. The computer-readable storage medium may be, but is not limited to, an electrical, magnetic, optical, electromagnetic, infrared or semiconductor system, apparatus or device, or any combination thereof. More specific examples of the computer-readable storage medium may include, but are not limited to, an electrical connection with one or more wires, a portable computer magnetic disk, a hard disk, an RAM, an ROM, an erasable programmable read-only memory (EPROM, or a flash memory), an optical fiber, a portable compact disk read-only memory (CD-ROM), an optical memory device, a magnetic memory device, or any appropriate combination thereof. In the present disclosure, the computer-readable storage medium may be any tangible medium including or storing a program. The program may be used by or used in conjunction with an instruction execution system, apparatus or device. In the present disclosure, the computer-readable signal medium may include a data signal propagated on a base band or as part of a carrier wave, and computer-readable program codes are carried in the data signal. The data signal propagated in this manner may be in multiple forms and includes, but is not limited to, an electromagnetic signal, an optical signal, or any appropriate combination thereof. The computer-readable signal medium may further be any computer-readable medium other than the computer-readable storage medium. The computer-readable signal medium may send, propagate, or transmit a program used by or used in conjunction with an instruction execution system, apparatus, or device. The program codes included on the computer-readable medium may be transmitted via any appropriate medium which includes, but is not limited to, a wire, an optical cable, a radio frequency (RF), or any appropriate combination thereof.

In some embodiments, clients and servers may communicate using any currently known or future developed network protocol, such as HyperText Transfer Protocol (HTTP), and may be interconnected with any form or medium of digital data communication (such as a communication network). Examples of the communication network include a local area network (LAN), a wide area networks (WAN), an inter-network (such as the Internet), and a peer-to-peer network (such as an ad hoc peer-to-peer network), as well as any currently known or future developed network.

The computer-readable medium described above may be included in the electronic device or may exist alone without being assembled into the electronic device.

The computer-readable medium carries one or more programs that, when executed by the electronic device, cause the electronic device to perform: acquiring a source speech corresponding to a to-be-translated language; acquiring a specified target language; inputting the source speech and indication information matched with the target language into a pre-trained speech translation model, where the speech translation model is configured to translate a language in a first language set into a language in a second language set, the first language set includes multiple languages, the first language set includes the to-be-translated language, the second language set includes multiple languages, and the second language set includes the target language; and acquiring a translated speech corresponding to the target language and output by the speech translation model; where the to-be-translated language is different from the target language.

Computer program codes for performing the operations of the present disclosure may be written in one or more programming languages or combination thereof. The preceding one or more programming languages include, but are not limited to, object-oriented programming languages such as Java, Smalltalk and C++, as well as conventional procedural programming languages such as "C" or similar programming languages. The program codes may be executed entirely on a user computer, partly on the user computer, as a stand-alone software package, partly on the user computer and partly on a remote computer, or entirely on the remote computer or server. In the case relate to the remote computer, the remote computer may be connected to the user computer via any kind of network including an LAN or a WAN, or may be connected to an external computer (for example, via the Internet through an Internet service provider).

The flowcharts and block diagrams in the drawings show the possible architecture, function and operation of the system, method and computer program product according to various embodiments of the present disclosure. In this regard, each block in the flowcharts or block diagrams may represent one module, program segment, or part of codes, which includes one or more executable instructions for implementing specified logical functions. It is also to be noted that in some alternative implementations, the functions noted in the blocks may occur out of the order noted in the drawings. For example, two blocks shown in succession may in fact be executed substantially concurrently or the blocks may sometimes be executed in the reverse order, depending upon the functionality involved. It is also to be noted that each block of the block diagrams and/or flowcharts, and combinations of blocks in the block diagrams and/or flowcharts can be implemented by specific purpose hardware-based systems which perform the specified functions or operations, or combinations of specific purpose hardware and computer instructions.

The described modules involved in the embodiments of the present disclosure may be implemented in the form of software or hardware. The names of the modules do not constitute a limitation on the modules themselves. For example, a target language specifying module may also be described as "a module for acquiring the specified target language".

The functions described above may be performed, at least partially, by one or more hardware logic components. For example, and without limitations, example types of hardware logic components that may be used include: a field-programmable gate array (FPGA), an application-specific integrated circuit (ASIC), an application-specific standard product (ASSP), system on a chip (SOC), a complex programmable logic device (CPLD) and the like.

In the context of the present disclosure, a machine-readable medium may be a tangible medium that may include or store a program for used by or used in conjunction with an instruction execution system, apparatus, or device.

The machine-readable medium may be a machine-readable signal medium or a machine-readable storage medium. The machine-readable storage medium may include, but is not limited to, an electrical, magnetic, optical, electromagnetic, infrared or semiconductor system, apparatus or device, or any combination thereof. More specific examples of the machine-readable storage medium may include an electrical connection with one or more wires, a portable computer magnetic disk, a hard disk, an RAM, an ROM, an EPROM, a flash memory, an optical fiber, a CD-ROM, an optical memory device, a magnetic memory device, or any appropriate combination thereof.

According to one or more embodiments of the present disclosure, the present disclosure provides a speech translation method. The method includes the steps described below.

A source speech corresponding to a to-be-translated language is acquired.

A specified target language is acquired.

The source speech and indication information matched with the target language are input into a pre-trained speech translation model, where the speech translation model is configured to translate a language in a first language set into a language in a second language set, the first language set includes multiple languages, the first language set includes the to-be-translated language, the second language set includes multiple languages, and the second language set includes the target language.

A translated speech corresponding to the target language and output by the speech translation model is acquired. The to-be-translated language is different from the target language.

According to one or more embodiments of the present disclosure, in the speech translation method provided by the present disclosure, the step in which the translated speech corresponding to the target language and output by the speech translation model is acquired includes the following steps: an encoder in the speech translation model extracts a speech feature in the source speech and performs encoding, to form a feature vector of the source speech, where the speech translation model is a Seq2Seq model; and a decoder in the speech translation model maps, according to the feature vector and the target language, the feature vector into a speech sequence of the target language as the translated speech.

According to one or more embodiments of the present disclosure, in the speech translation method provided by the present disclosure, the step in which the encoder in the speech translation model extracts the speech feature in the source speech and performs the encoding, to form the feature vector of the source speech includes the following steps: the encoder segments the source speech to form at least one source speech segment; the encoder acquires a respective speech feature of each of the at least one source speech segment and the speech feature of the source speech to form at least one speech element, where the speech feature includes at least one of: a time duration, a frequency, an intensity, a timbre or a spectrum characteristic; and the encoder sequentially converts, according to all of the at least one speech element, an initial vector to form the feature vector.

According to one or more embodiments of the present disclosure, in the speech translation method provided by the present disclosure, the step in which the decoder in the speech translation model maps, according to the feature vector and the target language, the feature vector into the speech sequence of the target language includes the following steps: the decoder analyzes the feature vector to determine at least one alternative translated speech segment; and target translated speech segments matched with the target language are inquired from the at least one alternative translated speech segment, and the target translated speech segments are stitched to form the speech sequence of the target language.

According to one or more embodiments of the present disclosure, the speech translation method provided by the present disclosure, before the source speech is input into the pre-trained speech translation model, further includes the following steps: a sample pair set is acquired, where each sample pair in the sample pair set includes a respective target source speech and a respective target translated speech, and the respective target translated speech is marked with language information; and an initial model is trained according to the sample pair set to form the speech translation model, where the sample pair set corresponds to at least three languages.

According to one or more embodiments of the present disclosure, in the speech translation method provided by the present disclosure, the respective target source speech in each sample pair corresponds to at least two to-be-translated languages, and at least one to-be-translated language corresponding to the respective target source speech is different from a language of the target translated speech.

According to one or more embodiments of the present disclosure, in the speech translation method provided by the present disclosure, the encoder and the decoder each include a neural network model.

According to one or more embodiments of the present disclosure, the present disclosure provides a speech translation apparatus. The apparatus includes a source speech acquisition module, a target language specifying module, a language translation module and a translated speech acquisition module.

The source speech acquisition module is configured to acquire a source speech corresponding to a to-be-translated language.

The target language specifying module is configured to acquire a specified target language.

The language translation module is configured to input the source speech and indication information matched with the target language into a pre-trained speech translation model, where the speech translation model is configured to translate a language in a first language set into a language in a second language set, the first language set includes multiple languages, the first language set includes the to-be-translated language, the second language set includes multiple languages, and the second language set includes the target language.

The translated speech acquisition module is configured to acquire a translated speech corresponding to the target language and output by the speech translation model. The to-be-translated language is different from the target language.

According to one or more embodiments of the present disclosure, in the speech translation apparatus provided by the present disclosure, the translated speech acquisition module includes a Seq2Seq model translation unit. The Seq2Seq model translation unit is configured to, through the encoder in the speech translation model, extract a speech feature in the source speech and perform encoding to form a feature vector of the source speech, where the speech translation model is a Seq2Seq model; and through the decoder in the speech translation model and according to the feature vector and the target language, map the feature vector into a speech sequence of the target language as the translated speech.

According to one or more embodiments of the present disclosure, in the speech translation apparatus provided by the present disclosure, the Seq2Seq model translation unit includes an encoding subunit. The encoding subunit is configured to, through the encoder, segment the source speech to form at least one source speech segment; through the encoder, acquire a respective speech feature of each of the at least one source speech segment and the speech feature of the source speech to form at least one speech element, where the speech feature includes at least one of: a time duration, a frequency, an intensity, a timbre or a spectrum characteristic; and through the encoder and according to all of the at least one speech element, sequentially convert an initial vector to form the feature vector.

According to one or more embodiments of the present disclosure, in the speech translation apparatus provided by the present disclosure, the Seq2Seq model translation unit includes a decoding subunit. The decoding subunit is configured to, through the decoder, analyze the feature vector to determine at least one alternative translated speech segment; and inquire, from the at least one alternative translated speech segment, target translated speech segments matched with the target language, and stitch the target translated speech segments to form the speech sequence of the target language.

According to one or more embodiments of the present disclosure, in the speech translation apparatus provided by the present disclosure, before the source speech is input into the pre-trained speech translation model, the following operations are further performed: acquiring a sample pair set is, where each sample pair in the sample pair set includes a respective target source speech and a respective target translated speech, and the respective target translated speech is marked with language information; and training an initial model according to the sample pair set to form the speech translation model, where the sample pair set corresponds to at least three languages.

According to one or more embodiments of the present disclosure, in the speech translation apparatus provided by the present disclosure, the respective target source speech in each sample pair corresponds to at least two to-be-translated languages, and at least one to-be-translated language corresponding to the respective target source speech is different from a language of the target translated speech.

According to one or more embodiments of the present disclosure, in the speech translation apparatus provided by the present disclosure, the encoder and the decoder each include a neural network model.

According to one or more embodiments of the present disclosure, the present disclosure provides an electronic device. The electronic device includes a memory, a processor and a computer program stored in the memory and executable by the processor; where the processor, when executing the computer program, performs the speech translation method of any embodiment of the present disclosure.

According to one or more embodiments of the present disclosure, the present disclosure provides a computer-readable storage medium storing a computer program, where the computer program, when executed by a processor, performs the speech translation method of any embodiment of the present disclosure.

The above description is only illustrative of embodiments of the present disclosure and the technical principles used therein. Those skilled in the art should understand that the disclosure scope involved in the present disclosure is not limited to the schemes formed by the particular combinations of the features described above, and is also intended to cover other schemes which may be formed by any combination of the features described above or their equivalents without departing from the concept of the present disclosure. For example, the latter schemes may be schemes formed by mutual substitutions between the features described above and the features disclosed (but not limited to) in the present disclosure that have similar functions.

In addition, although the operations are depicted in a particular order, this should not be construed as requiring that such operations should be performed in the particular order shown or in a sequential order. In certain circumstances, multitasking and parallel processing may be advantageous. Similarly, although specific implementation details are included in the above, these should not be construed as limiting the scope of the present disclosure. Some features described in the context of separate embodiments may also be implemented in combination in a single embodiment. Conversely, various features described in the context of a single embodiment may also be implemented in multiple embodiments, individually or in any suitable sub-combination.

Although the subject matter is described in the language specific to structural features and/or methodological logic acts, it is to be understood that the subject matter defined in the appended claims is not necessarily limited to the specific features or acts described above. Conversely, the specific features and acts described above are merely example forms of implementing the claims.

What is claimed is:

1. A speech translation method, comprising:
acquiring a source speech corresponding to a to-be-translated language;
acquiring a specified target language;
inputting the source speech and indication information matched with the target language into a pre-trained speech translation model, wherein the speech translation model is configured to translate a speech corresponding to a language in a first language set into another speech corresponding to a language in a second language set, the first language set comprises a plurality of languages, the first language set comprises the to-be-translated language, the second language set comprises a plurality of languages, the second language set comprises the target language, and the to-be-translated language is different from the target language; and
acquiring a translated speech corresponding to the target language and output by the speech translation model;
wherein acquiring the translated speech corresponding to the target language and output by the speech translation model comprises:
extracting, by an encoder in the speech translation model, a speech feature in the source speech, and performing encoding, to form a feature vector of the source speech, wherein the speech translation model is a sequence to sequence (Seq2Seq) model; and
mapping, by a decoder in the speech translation model, the feature vector of the source speech into a speech sequence of the target language according to the feature vector of the source speech and the target language and using the speech sequence of the target language as the translated speech,
wherein mapping, by the decoder in the speech translation model, the feature vector of the source speech into the speech sequence of the target language according to the feature vector of the source speech and the target language comprises:
  analyzing, by the decoder, the feature vector of the source speech to determine at least one alternative translated speech segment; and
  inquiring, from the at least one alternative translated speech segment, target translated speech segments matched with the target language, and stitching the target translated speech segments to form the speech sequence of the target language.

2. The method according to claim 1, before inputting the source speech into the pre-trained speech translation model, further comprising:
  acquiring a sample pair set, wherein each sample pair in the sample pair set comprises a respective target source speech and a respective target translated speech, and the respective target translated speech is marked with language information; and
  training, according to the sample pair set, an initial model to form the speech translation model, wherein the sample pair set corresponds to at least three languages.

3. The method according to claim 2, wherein the respective target source speech in each sample pair corresponds to at least two to-be-translated languages, and at least one to-be-translated language corresponding to the respective target source speech is different from a language of the target translated speech.

4. The method according to claim 1, wherein extracting, by the encoder in the speech translation model, the speech feature in the source speech, and performing the encoding, to form the feature vector of the source speech comprises:
  segmenting, by the encoder, the source speech to form at least one source speech segment;
  acquiring, by the encoder, a respective speech feature of each of the at least one source speech segment and the speech feature of the source speech to form at least one speech element, wherein the speech feature comprises at least one of: a time duration, a frequency, an intensity, a timbre or a spectrum characteristic; and
  converting, by the encoder and according to all of the at least one speech element, an initial vector to form the feature vector.

5. The method according to claim 1, wherein the encoder and the decoder each comprise a neural network model.

6. An electronic device, comprising a memory, a processor and a computer program stored in the memory and executable by the processor, wherein the processor, when executing the computer program, performs:
  acquiring a source speech corresponding to a to-be-translated language;
  acquiring a specified target language;
  inputting the source speech and indication information matched with the target language into a pre-trained speech translation model, wherein the speech translation model is configured to translate a speech corresponding to a language in a first language set into another speech corresponding to a language in a second language set, the first language set comprises a plurality of languages, the first language set comprises the to-be-translated language, the second language set comprises a plurality of languages, the second language set comprises the target language, and the to-be-translated language is different from the target language; and
  acquiring a translated speech corresponding to the target language and output by the speech translation model;

wherein acquiring the translated speech corresponding to the target language and output by the speech translation model comprises:
  extracting, by an encoder in the speech translation model, a speech feature in the source speech, and performing encoding, to form a feature vector of the source speech, wherein the speech translation model is a sequence to sequence (Seq2Seq) model; and
  mapping, by a decoder in the speech translation model, the feature vector of the source speech into a speech sequence of the target language according to the feature vector of the source speech and the target language and using the speech sequence of the target language as the translated speech,
wherein mapping, by the decoder in the speech translation model, the feature vector of the source speech into the speech sequence of the target language according to the feature vector of the source speech and the target language comprises:
  analyzing, by the decoder, the feature vector of the source speech to determine at least one alternative translated speech segment; and
  inquiring, from the at least one alternative translated speech segment, target translated speech segments matched with the target language, and stitching the target translated speech segments to form the speech sequence of the target language.

7. The electronic device of claim 6, before inputting the source speech into the pre-trained speech translation model, further performing:
  acquiring a sample pair set, wherein each sample pair in the sample pair set comprises a respective target source speech and a respective target translated speech, and the respective target translated speech is marked with language information; and
  training, according to the sample pair set, an initial model to form the speech translation model, wherein the sample pair set corresponds to at least three languages.

8. The electronic device of claim 7, wherein the respective target source speech in each sample pair corresponds to at least two to-be-translated languages, and at least one to-be-translated language corresponding to the respective target source speech is different from a language of the target translated speech.

9. The electronic device of claim 6, wherein extracting, by the encoder in the speech translation model, the speech feature in the source speech, and performing the encoding, to form the feature vector of the source speech comprises:
  segmenting, by the encoder, the source speech to form at least one source speech segment;
  acquiring, by the encoder, a respective speech feature of each of the at least one source speech segment and the speech feature of the source speech to form at least one speech element, wherein the speech feature comprises at least one of: a time duration, a frequency, an intensity, a timbre or a spectrum characteristic; and
  converting, by the encoder and according to all of the at least one speech element, an initial vector to form the feature vector.

10. The electronic device of claim 6, wherein the encoder and the decoder each comprise a neural network model.

11. A non-transitory computer-readable storage medium storing a computer program, wherein the computer program, when executed by a processor, performs:
  acquiring a source speech corresponding to a to-be-translated language;

acquiring a specified target language;

inputting the source speech and indication information matched with the target language into a pre-trained speech translation model, wherein the speech translation model is configured to translate a speech corresponding to a language in a first language set into another speech corresponding to a language in a second language set, the first language set comprises a plurality of languages, the first language set comprises the to-be-translated language, the second language set comprises a plurality of languages, the second language set comprises the target language, and the to-be-translated language is different from the target language; and acquiring a translated speech corresponding to the target language and output by the speech translation model;

wherein acquiring the translated speech corresponding to the target language and output by the speech translation model comprises:

extracting, by an encoder in the speech translation model, a speech feature in the source speech, and performing encoding, to form a feature vector of the source speech, wherein the speech translation model is a sequence to sequence (Seq2Seq) model; and mapping, by a decoder in the speech translation model, the feature vector of the source speech into a speech sequence of the target language according to the feature vector of the source speech and the target language and using the speech sequence of the target language as the translated speech, wherein mapping, by the decoder in the speech translation model, the feature vector of the source speech into the speech sequence of the target language according to the feature vector of the source speech and the target language comprises:

analyzing, by the decoder, the feature vector to determine at least one alternative translated speech segment; and inquiring, from the at least one alternative translated speech segment, target translated speech segments matched with the target language, and stitching the target translated speech segments to form the speech sequence of the target language.

12. The non-transitory computer-readable storage medium of claim 11, before inputting the source speech into the pre-trained speech translation model, further performing:

acquiring a sample pair set, wherein each sample pair in the sample pair set comprises a respective target source speech and a respective target translated speech, and the respective target translated speech is marked with language information; and training, according to the sample pair set, an initial model to form the speech translation model, wherein the sample pair set corresponds to at least three languages.

13. The non-transitory computer-readable storage medium of claim 12, wherein the respective target source speech in each sample pair corresponds to at least two to-be-translated languages, and at least one to-be-translated language corresponding to the respective target source speech is different from a language of the target translated speech.

14. The non-transitory computer-readable storage medium of claim 11, wherein extracting, by the encoder in the speech translation model, the speech feature in the source speech, and performing the encoding, to form the feature vector of the source speech comprises:

segmenting, by the encoder, the source speech to form at least one source speech segment;

acquiring, by the encoder, a respective speech feature of each of the at least one source speech segment and the speech feature of the source speech to form at least one speech element, wherein the speech feature comprises at least one of: a time duration, a frequency, an intensity, a timbre or a spectrum characteristic; and converting, by the encoder and according to all of the at least one speech element, an initial vector to form the feature vector.

\* \* \* \* \*